United States Patent [19]

Ura et al.

[11] 4,138,699
[45] Feb. 6, 1979

[54] AUTOMATIC TAPE LOADING TYPE RECORDING AND/OR REPRODUCING APPARATUS

[75] Inventors: Junichi Ura, Yokohama; Toshio Murakawa, Sagamihara, both of Japan

[73] Assignee: Victor Company of Japan, Ltd., Yokohama, Japan

[21] Appl. No.: 802,664

[22] Filed: Jun. 2, 1977

[30] Foreign Application Priority Data

Jun. 4, 1976 [JP] Japan .................................. 51-65262
Jun. 4, 1976 [JP] Japan .................................. 51-65263

[51] Int. Cl.² ........................ G11B 15/66; G11B 23/04
[52] U.S. Cl. ......................................... 360/85; 360/95
[58] Field of Search ............................. 360/85, 95, 96

[56] References Cited

U.S. PATENT DOCUMENTS

| | | | |
|---|---|---|---|
| 3,825,944 | 7/1974 | Terao et al. | 360/85 |
| 3,831,198 | 8/1974 | Kihara et al. | 360/85 |
| 3,864,742 | 2/1975 | Katoh | 360/85 |
| 3,911,492 | 10/1975 | Ura | 360/85 |
| 3,968,517 | 7/1976 | Chimura et al. | 360/85 X |
| 3,979,772 | 9/1976 | Umeda | 360/85 |

Primary Examiner—John H. Wolff

[57] ABSTRACT

An automatic tape loading type recording and/or reproducing apparatus employs a guide drum having heads for recording or reproducing signals on or from a tape. A pair of tape guides engage the tape, as it is moving in the vicinity of the guide drum, and guide it along a specific tape travel path, over a specific angular expanse of the guide drum. The tape guides move in a specific direction to a specific position at the time of loading, and move, in the reverse direction, from the specific position at the time of unloading. A checking means contacts the tape guides which have been moved to the specific position and prevents a displacement of the tape guides in a reverse direction, during recording or reproducing mode of operation.

8 Claims, 12 Drawing Figures

AUTOMATIC TAPE LOADING TYPE RECORDING AND/OR REPRODUCING APPARATUS

BACKGROUND OF THE INVENTION

The present invention relates generally to an automatic tape loading recording and/or reproducing apparatus, and more particularly to an apparatus in which a tape is automatically loaded by guide poles. Moreover, the traveling tape is thereafter guided in a stable manner.

Heretofore, automatic tape loading type recording and/or reproducing apparatus had a tape which is automatically engaged by guide poles and drawn out of a cassette. The tape is loaded into a specific tape travel path around a guide drum. In an apparatus of this type, the guide for loading the tape determines the range of the angle with which the tape is in wrapping contact with the guide drum. At the same time, these poles guide the traveling tape.

In an automatic tape loading type recording and/or reproducing apparatus of this type, the guide poles are adapted to move positionally at the time of tape loading. They are not fixed, as in a recording/reproducing apparatus which does not have automatic tape loading. For this reason, there is a possibility of some displacement of the guide poles even at the positions which they reach upon completion of the tape loading operation in comparison with a fixed tape of guide poles.

For this reason, when an excessive tension is imparted to the tape at the time of recording or reproducing, there is the possibility that the guide poles will undergo an unnecessary displacement, in the unloading direction, from their proper positions. If the guide poles are unnecessarily displaced in this manner, upon the completion of loading, the tape travel will become unstable around the guide drum even when this displacement is extremely small. This displacement will give rise to the serious problem of defective recording or reproducing.

Furthermore, the tape travel path around the cylindrical surface of the guide drum is determined by the positions of these guide poles. Accordingly, for the tape to travel along its correct travel path, it is necessary for the guide poles to have the correct positions, orientations, and other features. However, if the guide poles are positionally movable as mentioned above, their positions, orientations, and other features tend to become inaccurate upon the completion of tape loading.

SUMMARY OF THE INVENTION

Accordingly, it is a general object of the present invention to provide a novel and useful automatic tape loading recording and/or reproducing apparatus in which the above described problems have been overcome.

Another object of the invention is to provide an automatic tape loading type recording and/or reproducing apparatus having means for suppressing positional movement of loading means, for loading a tape in wrapping contact around the cylindrical surface of parts such as rotating heads. Movement suppression is from the position of the guide poles at the completion of loading. The suppression prevents movement in the unloading direction. By this suppression, the tape is caused to travel stably in wrapping contact around the guide drum, which contains rotating magnetic heads, even when the tape tension fluctuates during tape travel.

A further object of the invention is to provide an automatic tape loading type of recording and/or reproducing apparatus in which the loading means is displaceably supported for shifting the loading means. The loading means is accurately positioned relative to the guide drum, at the completion of the loading operation, irrespective of some dimensional errors, deformations, and other conditions of the loading mechanism. The travel path of the tape is held in constant wrapping contact around the guide drum surface.

Other objects and features of the present invention will be apparent from the following detailed description set forth in conjunction with the accompanying drawings.

DETAILED DESCRIPTION

Figure 1:
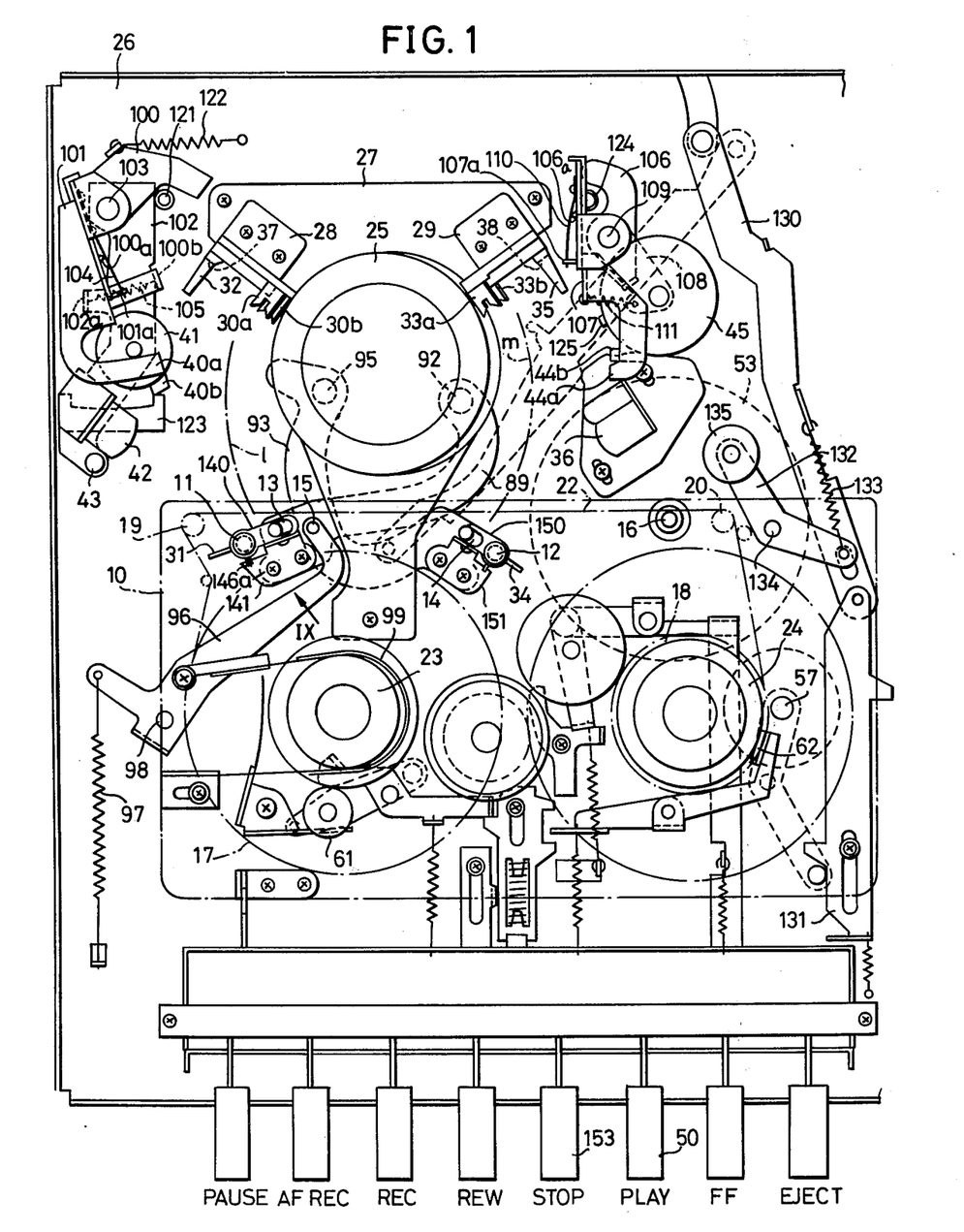
FIG. 1 and FIG. 2 are plan views respectively showing one embodiment of an automatic tape loading type recording and/or reproducing apparatus, according to the present invention, with the apparatus shown in a stop mode and in a state after tape loading has been completed.

Upon recording or reproducing, a cassette (or cartridge) 10 is placed in a loading position in the recording/reproducing apparatus, as indicated by two-dot chain line in FIG. 1.

A pair of up-right guide rollers 11 and 12, a pair of inclined guide poles 13 and 14, a tension pole 15, and a capstan 16 respectively enter into an opening in the bottom of the cassette 10 and fit into the interior thereof. These members are disposed on the inner side of the tape, that is, on the side confronting the non-magnetic side of the tape. Guide poles 19 and 20 guide a tape 22 in its span between a tape supply roll 17 and a take-up roll 18. The magnetic surface of the tape faces the front of the cassette 10.

When the cassette 10 is placed in its operational position, a supply reel and a take-up reel (neither being shown) respectively fit onto a supply side reel disc 23 and a take-up side reel disc 24 contained within the cassette 10. The tape rolls 17 and 18 are respectively wound on these reels.

Figure 5:
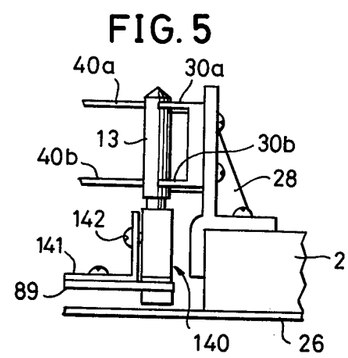
FIG. 5 and FIG. 6 are elevation views, respectively showing a guide pole engagement or clamping mechanism, as viewed in the arrow directions V and VI in FIG. 2.
Figure 6:
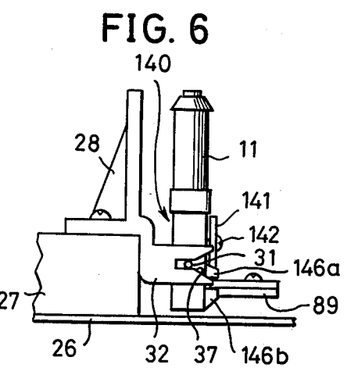

A cylindrical guide drum 25 comprises an upper rotating drum carrying rotating video heads and a lower drum fixed to a guide drum base 27. The base 27 is fixed to a chassis 26 by screws, at a specific position. A first position defining member 28 and a second position defining member 29 are respectively fixed, by screws, to the guide drum base 27, on opposite sides of the drum 25. The first position defining member 28 has stop members 30a and 30b, and a guide member 32 projecting therefrom. The stop members 30a and 30b have V-shaped grooves for engaging the inclined guide pole 13 at the upper and lower ends thereof, as indicated in FIG. 5, when the loading has been completed. The guide member 32 operates, as indicated in FIG. 6, to define the height position of a reference pin 31 described hereinafter, at the completion of the loading. The second position defining member 29 also has stop members 33a and 33b formed with V-shaped grooves for engaging the inclined guide pole 14. A guide member 35 defines the height position of a reference pin 34 engaged therein. The members 33a, 33b, and 35 project from the member 29.

In the stop mode of the apparatus, a pair of clamp arms 40a and 40b are retracted, together with an impedance roller 41, an erasing head 42, and a guide roller 43. The retracted positions are outside of the moving path (indicated by single-dot chain line l in FIG. 1) of the guide roller 11 and the guide pole 13 during the loading mode. Another pair of clamp arms 44a and 44b are also retracted, together with an impedance roller 45, to positions outside of the moving path (indicated by single-dot chain line m in FIG. 1) of the guide roller 12 and the guide pin 14 during the loading mode.

When a PLAY button 50 is pushed, a motor (not shown) is started. A fly-wheel 53 and the capstan 16 rotate unitarily in the clockwise direction, and a drive pulley 57 rotates in the counterclockwise direction. As another result of the manipulation of the PLAY button 50, a roller 60 and a brake shoe 62 respectively separate from the reel discs 23 and 24, which are thereupon released from their braked state.

Figure 3:
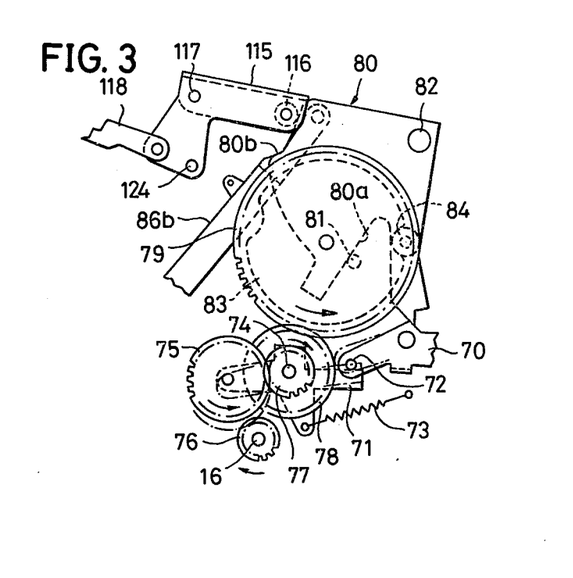
FIG. 3 is a plan view showing mechanical parts for driving a tape loading mechanism and related mechanisms in the apparatus illustrated in FIGS. 1 and 2.

On the other hand, when the PLAY button 50 is pressed, a movement is transmitted through an intercoupling mechanism to rotate a lever 70 (FIG. 3), in the clockwise direction. A lever 71 is released from its locked state when a pin 72 on the lever 70 is moved away. Lever 71 is rotated counterclockwise about a shaft 74 responsive to the force of a spring 73. This causes a gear 75, rotatably supported on the distal end of the lever 71, to mesh with a gear 76 mounted coaxially with the capstan 16. As a consequence, the rotation of the gear 76 is transmitted by way of the gear 75 and gears 77 and 78 to a gear 79, in a speed reduced state.

As the gear 79 rotates counterclockwise, an approximately fan shaped cam structure 80 is compulsorily rotated clockwise, with respect to a shaft 82. Its surface 80a is guided by an actuating pin 81 which is fixed to the lower surface of the gear 79. When the gear 79 has rotated through approximately one half revolution, it is locked by the action of a circular cam structure 83 and a roller 84. At the same time, the lever 70 is rotated counterclockwise by a mechanism not shown, and the gear 75 separates from the gear 76. Furthermore, the cam structure 80 reaches its final rotational position as indicated by the single-dot chain line in FIG. 4.

Together with the rotation of the cam structure 80 to the vicinity of the final rotational position, a rotating lever 87 is rotated counterclockwise about a shaft 88. The rotation is caused by a pair of coupling levers 86a and 86b which are connected by a spring 85. As a consequence of the rotation imparted to the lever 87, a coupling member 90 and an arm 91 cause a rotating lever 89 to rotate clockwise about a shaft 92. Simultaneously, a coupling member 94 causes another rotating lever 93 to rotate counterclockwise about a shaft 95. The levers 89 and 93 rotate to positions indicated by the single-dot chain line in FIG. 4, that is, to the positions indicated in FIG. 2. The rotating levers 89 and 93 are still urged to rotate in the loading direction, as a result of the tensile force of the spring 85. The inclined guide pole 13 is pressed into contact with the V-shaped grooves of the stop members 30a and 30b. The inclined guide pole 14 is pressed into contact with the V-shaped grooves of the stop members 33a and 33b.

As a consequence of the rotation of the pair of rotating levers 89 and 93, the magnetic tape 22 is drawn out of the cassette 10. The tape is intercepted and engaged by the guide rollers 11 and 12, and the guide poles 13 and 14. The tape is wrapped over a specific angular expanse of the guide drum 25.

During this tape loading operation, the impedance rollers 41 and 45 are still in their retracted positions. The guide rollers 11 and 12 move smoothly without colliding with the impedance rollers 41 and 45.

At an intermediate point in the tape loading operation, the tension arm 96 is released from its engaged state. The arm 96 is turned counterclockwise about a shaft 98 responsive to the tensile force of a spring 97. As a consequence, the tension pole 15 is extracted from the cassette and it makes contact with the magnetic tape 22. A brake band 99 is tightened, to operate a tension servo mechanism.

Figure 7A:
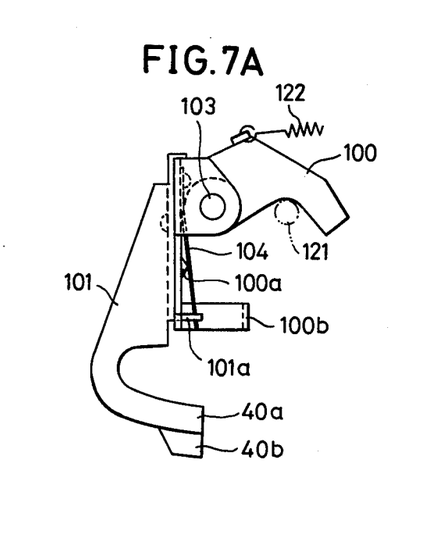
FIGS. 7A and 7B are enlarged plan views respectively showing a clamp arm mechanism for clamping a supply side guide pole in the unoperated and operated states.

A mechanism for clamping the guide pole 13 comprises, as indicated in FIG. 1 and FIG. 7A, an actuating arm 100, an arm 102 for supporting the impedance roller 41, the erasing head 42, and other parts, and a clamp arm 101 having the pair of arms 40a and 40b at the distal end thereof. The arms 100 and 102 are pivoted independently on a pin 103. The arm 101 is held by the up-right side surface of the actuating arm 100. Moving as a whole, the arms 100, 102, and 101 are rotated in the clockwise direction responsive to a spring 122. A projecting part 101a of the clamp arm 101 is engaged by the free end of a leaf spring 104. The proximal part of spring 104 is fixed to the actuating arm 100 by a screw. The leaf spring 104 is contacted, at approximately the middle part thereof, by a projection 100a of the arm 100. The support arm 102 is urged to rotate counterclockwise responsive to the tensile force of a spring 105 which is stretched between a bent part 102a and a bent arm 100b of the actuating arm 100. However, the rotation of arm 102 is limited by being engaged at a side part thereof by the bent arm 100b. The impedance roller 41 and related parts are retracted.

Figures 8A, 8B:
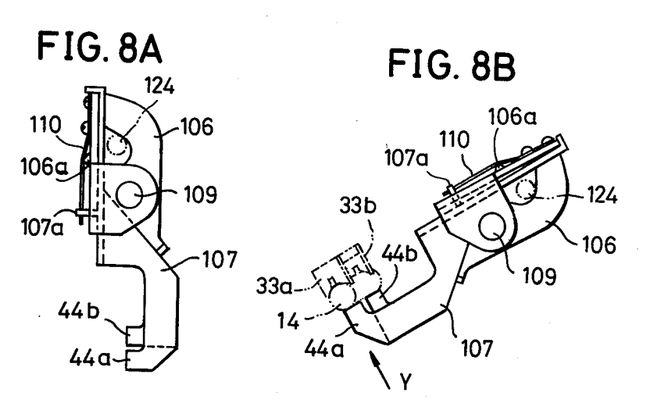
FIGS. 8A and 8B are enlarged plan views respectively showing a clamp arm mechanism for clamping a take-up side guide pole in the unoperated and operated states.

Another mechanism for clamping the guide pole 14 comprises, as indicated in FIG. 1 and FIG. 8A, an actuating arm 106, and an arm 108 for supporting the impedance roller 45. The arms 106 and 108 are independently pivoted on a shaft 109. A clamp arm 107 which has a pair of clamp arms 44a and 44b is held by the vertical side of the actuating arm 106. These parts are rotated, as a whole, in the counterclockwise direction. A projecting part 107a of the clamp arm 107 engages the free end of a leaf spring 110, the proximal part of which is fixed by screws to the actuating arm 106. The leaf spring 110 is contacted at approximately the middle part thereof by a projection 106a of the arm 106. The support arm 108 is urged to rotate clockwise responsive to a spring 111. However, its rotation is limited by the bent part of the arm 106, whereby the impedance roller 45 is held at a retracted position.

Figure 4:
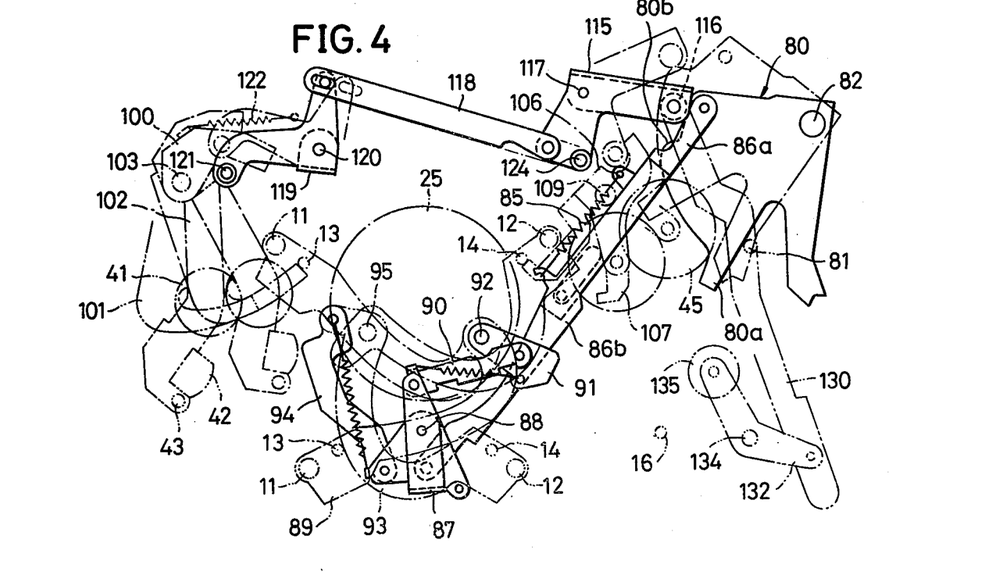
FIG. 4 is a plan view showing the tape loading mechanism which is actuated by the mechanism parts shown in FIG. 3.

When the cam structure 80 rotates further, to its terminal position, a roller 116 supported on an L-shaped arm 115 shown in FIG. 4 is guided by an inclined cam surface 80b of the cam structure 80. The arm 115 rotates counterclockwise about a pin 117. This rotation of the arm 115 is transmitted through a coupling arm 118 to cause another L-shaped arm 119 to rotate clockwise about a pin 120.

Figure 2:
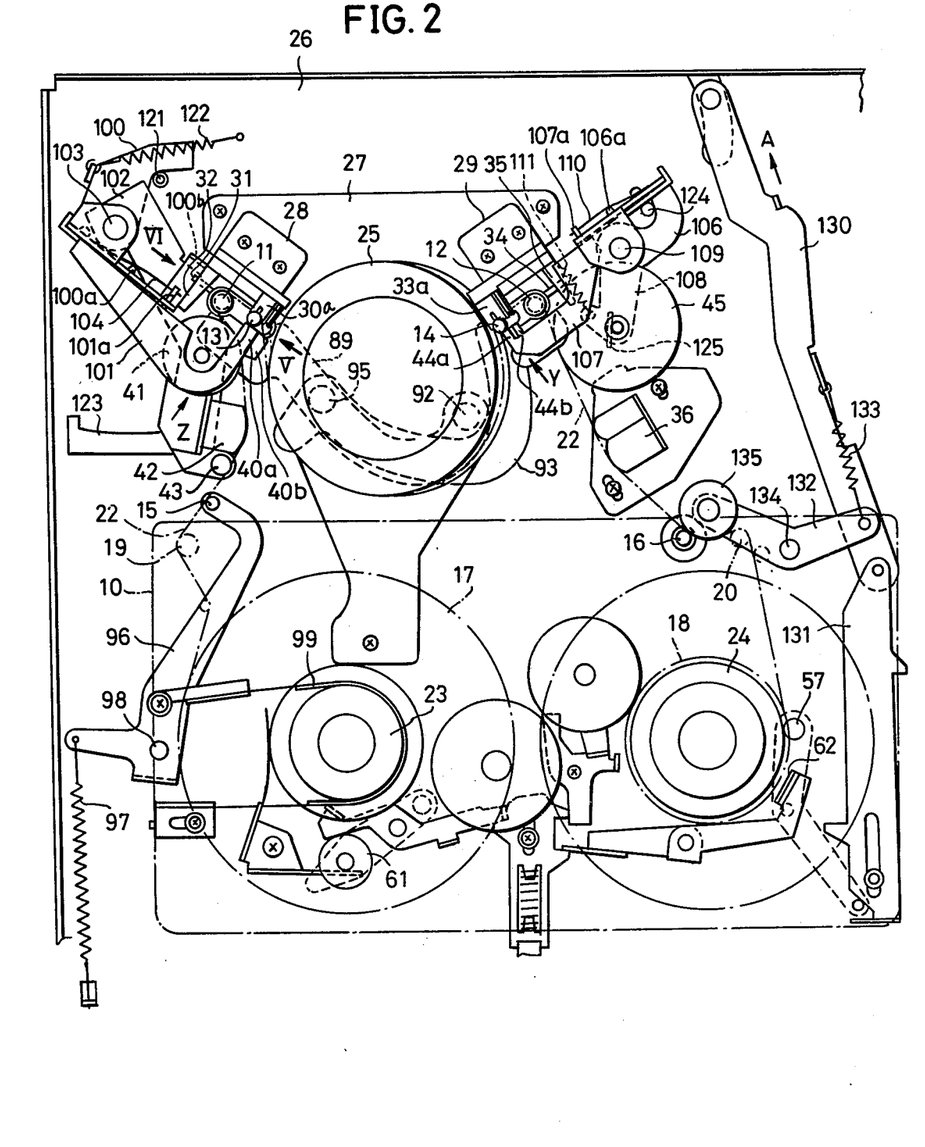

As a result of the rotation of the L-shaped arm 119, the actuating arm 100 is engaged and guided by the roller 121. Arm 100 rotates counterclockwise to its position indicated in FIG. 2, which is counter to the force of the spring 122. Interrelatedly with the rotation of the arm 100, the clamp arm 101 and the support arm 102 rotate counterclockwise. The support arm 102 is limited in its rotation at a position where it presses against a stop member 123 on the chassis. Arm 100 is still urged to rotate counterclockwise by the spring 105. The impedance roller 41, the erasing head 42, and the guide roller 43 thereby contact the tape 22 drawn out of the cassette, as indicated in FIG. 2.

By this arrangement a loading mechanism is simply constructed. The members which are necessary for recording and/or reproducing operations, such as the erasing head 42, move to their operational positions. There, they make contact with the tape 22 and rotate the engagement arm 101. Moreover, an, overall miniaturization of the apparatus is accomplished. In addition, the tape path becomes a simple loop at the time of recording and/or reproducing.

Figure 7B:
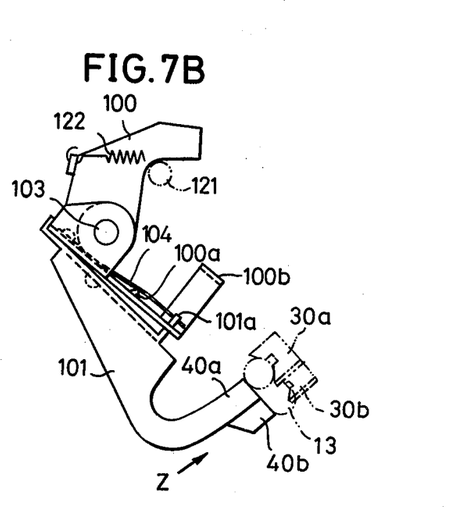

Moreover, the clamp arms 40a and 40b of the clamp arm 101 abut against the inclined guide pole 13 which has been pressed against the stop members 30a and 30b, respectively, as indicated in FIG. 5. The arm 100 is further caused to rotate thereafter. The clamp arm 101 is, therefore, subjected to a relatively large rotational force in the counterclockwise direction, as a result of the spring force of the leaf spring 104. Spring 104 is compulsorily deformed by the rotation of the arm 100, as indicated in FIG. 7B. As a consequence, while it is pressed against the stop members 33a and 33b, the inclined guide pole 14 is engaged and clamped at its upper end and its lower end by the clamp arms 40a and 40b. These arms are positioned at opposite sides of the magnetic tape 22. Guide pole 13 is pressed in the loading direction indicated by the arrow Z in FIG. 2 and FIG. 7B. Thus, the guide pole 13 is prevented from movement in the unloading direction and is positively positioned at the proper position.

Moreover, as a result of the above described counterclockwise rotation of the L-shaped arm 115, the actuating arm 106 is engaged and guided by the roller 124. Arm 115 rotates clockwise to its position indicated in FIG. 2. Interrelatedly with the rotation of the arm 106, the clamp arm 107 and the support arm 108 rotate clockwise. The support arm 108 is limited in its rotation at a position where it presses against a stop member 125 on the chassis. There, the arm 108 is still urged to rotate clockwise by a spring 111. The impedance roller 45 thereby contacts the tape 22 drawn out of the cassette as indicated in FIG. 2.

The clamp arms 44a and 44b of the clamp arm 107 abut against the inclined guide pole 14 which has been pressed against the stop members 33a and 33b, respectively. The arm 106 is further caused to rotate thereafter. To the clamp arm 107 is imparted a relatively large rotational force in the clockwise direction as a result of the spring force of the leaf spring 110, which is compulsorily deformed by the above rotation of the arm 106, as indicated in FIG. 8B. As a consequence, while it is pressed against the stop members 33a and 33b, the inclined guide pole 14 is engaged and clamped at its upper end and the lower end thereof by the clamp arms 44a and 44b which are positioned at opposite sides of the magnetic tape 22. Guide pole 14 is pressed in the loading direction, indicated by the arrow Y, in FIG. 2 and FIG. 8B. Thus, the guide pole 14 is prevented from movement in the unloading direction and is positively positioned at the proper position.

Accordingly, following the loading operation in the recording or reproducing mode the guide poles 13 and 14 are engaged or clamped by the clamp arms 40a, 40b, 44a, and 44b, despite a force acting in the unloading direction due to the tension of the traveling magnetic tape 22. Thus, the poles positively restricted against any movement thereof in the unloading direction. As a result, the traveling path of the magnetic tape 22 is kept secure on the inlet side and the outlet side with respect to the guide drum 25 in the tape traveling direction. Furthermore, since the guide poles 13 and 14 are pressed against the stop members 30a, 30b, 33a and 33b, they are held at their proper positions in a stable manner without even a very minute movement, due to the fluctuation of the tape tension. As a result, in the recording or reproducing mode, the magnetic tape 22 travels around the cylindrical surface of the guide drum 25, over a specific angular expanse, and along a specific travel path.

Moreover, the rotation of the arm 115 in the counterclockwise direction causes slide levers 130 and 131 to move in the arrow direction A. These slide levers are disposed on the chassis in a mutually intercoupled state. As a result of this movement of the slide lever 130, a pinch roller supporting arm 132 is rotated in the counterclockwise direction about a pin 134, by a large tensile force of a spring 133. Thereupon, a pinch roller 135 is pressed against the capstan 16, clamping the magnetic tape 22 therebetween. Moreover, as a result of the movement of the slide lever 131, the drive roller 57 is pressed into contact with the take-up reel disc 24.

Upon completion of the automatic tape loading, the tape 22 is drawn from the tape roll 17 on the tape-supply side past tension poles 15, and passed over a guide pole 43, and a full-width erasing head 43. Thereafter, it comes into contact with the impedance roller 41. The height position of the tape 22 is determined by the guide roller 11. The tape 22 is further guided and changed in direction by the guide pole 13. The tape 22 is held in a wrapping helical contact around the guide drum 25. While the tape 22 is thus held in wrapping contact, a video signal is recorded or reproduced by the rotating video heads.

After leaving the guide drum 25, the tape 22 is guided, positioned, and changed in direction by the guide pole 14 and the guide roller 12. Then, after contacting the above described impedance roller 45, the tape 22 contacts an audio and control signal recording and reproducing head 36. The tape 22 is thereafter clamped between and driven by the pinch roller 135 and the capstan 16. Then, it enters the cassette 10 and is wound on the tape roll 18.

The magnetic tape 22 travels stably around a specific angular expanse of the cylindrical surface of the guide drum 25. The specific tape path is defined by the pair of guide poles 13 and 14, without being influenced by fluctuations of the tape tension. Further, very minute fluctuations in the tape traveling speed are suppressed by the inertial rotation of the impedance rollers 41 and 45. Thus, the tape travel is rendered remarkably stable.

Figure 9:
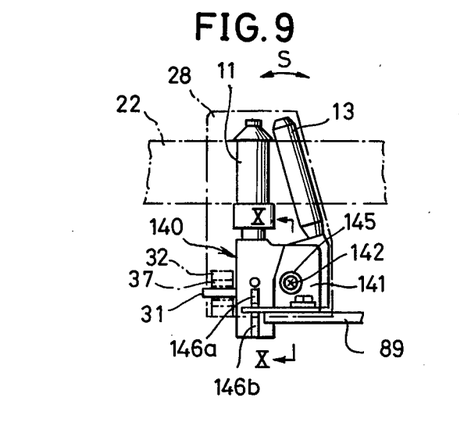
FIG. 9 is an elevation view of a guide pole mechanism, as viewed in the arrow direction IX in FIG. 1.
Figure 10:
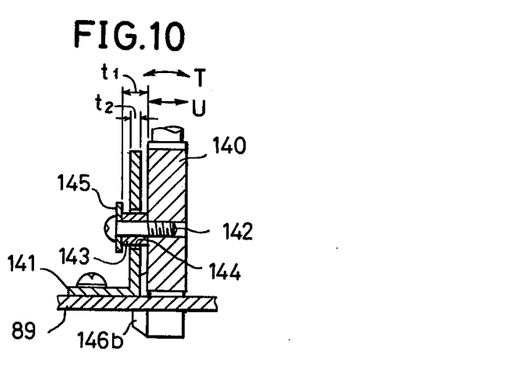
FIG. 10 is an enlarged vertical section taken along the line X—X in FIG. 9.

Next, the structure and operation of a guide pole mechanism will be described with further reference to FIG. 9 and FIG. 10.

A movable base structure 140 supports the guide roller 11. The guide pole 13 is loosely fitted to a bracket 141 which is fixed by screws to a distant end of rotating lever 89. Lever 89 is displaceable within a specific range. An annular spacer 143 is fixed to the movable base structure 140 by a screw 142 which has a longitudinal dimension $t_1$ that is larger than the thickness dimension $t_2$ of the bracket 141. The spacer 143 is loosely fitted in an opening 144 formed in the bracket 141. The above described mechanism thereby allows the movable base structure 140 to undergo rotational displacement about screw 142, as indicated by the arrow S. Rotational displacement is in the arrow direction T within a specific angular range, and displacement is in the linear direction, as indicated by the arrow U. These displacements are effected by movement of the spacer 143 inside of the opening 144 in a manner such that the spacer 143 is prevented from disengaging the opening 144, by a washer 145. The movable base structure 140 is allowed to undergo the above described rotational displacement in the arrow direction S, within a specific angular range defined by a pair of projections 146a and 146b, above and below the bracket 141.

Accordingly, in the loading mode the guide roller 11 and the guide pole 13 draw out the tape 22 with an inclination about the support part of the movable base structure 140. The inclination is in any direction according to the tension of the magnetic tape 22 as it is drawn out of the cassette. Therefore, the tape 22 is drawn out of the cassette without an excessive force being applied thereto.

Furthermore, when the loading is completed, the movable base structure 140 reaches the position as indicated in FIG. 2. The reference pin, fixed to the side of the base structure 140, enters the V-shaped groove 37 of the guide member 32 for defining a height position, as indicated in FIG. 6 (or by the two-dot chain line in FIG. 9). As the pin 31 enters the groove 37, the movable base structure 140 rotates in the arrow direction S to a predetermined position. The height position of the vertical guide roller 11 determines the position of the guide roller 11 flanges, which guide the edges of the tape.

Moreover, upon the completion of the tape loading, the inclined guide pole 13 is engaged within the V-shaped grooves of the stop members 30a and 30b. There is a rotational displacement of the movable base 140 mainly in the arrow direction T. Guide pole 13 is positioned in the predetermined, inclined direction where it is pressed into the V-shaped grooves by the clamp arms 40a and 40b, as indicated in FIG. 5.

Another movable base structure 150 has the guide roller 12 and the guide pole 14 mounted on a bracket 151, which is fixed by screws on the end of rotating lever 89. Accordingly, upon the completion of tape loading, the height of the upright guide roller 12 is defined by the engagement of the reference pin 34 within the V-shaped groove 38 of the guide member 35. The guide pole 14 is positioned by the cooperation of the stop members 33a and 33b and the clamp arms 44a and 44b.

For this reason, even if the tape loading mechanism is not assembled with the same high precision that was known heretofore, the guide rollers 11, 12, and the guide poles 13, 14 are set accurately at their proper positions after completion of the tape loading. Moreover, even if there are defects, such as deformations after long years of use, the set positions of the guide rollers 11 and 12 and the guide poles 13 and 14 do not change at the completion of the tape loading. These positions are maintained as in the initial operation. Therefore the tape travel path around the guide drum is held correctly, along the proper travel path. Accordingly, interchangeability of the apparatus is afforded over a long period of time. The complicated adjusting work heretofore required at the time of assembling is substantially eliminated. Thus, the assembling of the apparatus is facilitated.

When the STOP button 153 is manipulated during reproduction the PLAY button 50 is returned to its original position. The gear 79 rotates through approximately one half revolution, which is similar to the operation which occurs when the PLAY button is pressed. The cam structure 80 rotates counterclockwise to its position indicated by the full line in FIG. 4. As a result of the return action of the cam structure 80, the mechanisms operated in the tape loading mode are operated in the order and directions which are reverse to those in the loading mode. In the unloading mode, roller 61 winds the magnetic tape 22, which has been drawn out of the cassette, around the supply tape roll 17. The tape is thus accommodated within the cassette.

The apparatus of the present invention may also be adapted so that the above described guide rollers 11, 12 and the guide poles 13, 14 intercept the tape as it is being drawn out of the cassette by other means, and thereafter to move so as to load the tape in a wrapping contact with the guide drum.

Furthermore, the apparatus of the present invention may be so adapted that the clamp arms 40a, 40b, 44a, and 44b are merely locked at their operational positions so as to prevent unnecessary movement of the guide poles 13 and 14 in the unloading direction. In addition, the mechanism for supporting the guide rollers 11 and 12 and the guide poles 13 and 14 is not limited to that shown and described in the above described embodiment of the invention. The guide rollers and poles may be supported so as to be displaceable by a certain degree, with respect to the loading arm, by appropriate mechanisms using springs and the like.

Further, this invention is not limited to these embodiments. Variations and modifications may be made without departing from the scope and spirit of the invention.

What is claimed is:

1. An automatic tape loading type recording and/or reproducing apparatus comprising:
   a guide drum having heads for recording or reproducing signals on or from a tape;
   a pair of tape guide means for engaging said tape, said tape guide means moving to a specific position in the vicinity of said guide drum where said tape is fully loaded, said guide means guiding the tape at said specific position in a manner such that the tape travels along a specific tape travel path and over a specific angular expanse with respect to the guide drum;

means responsive to a loading operation for moving said tape guide means in a specific direction to said specific position when the tape is loaded into said specific tape travel path and responsive to an unloading operation for moving the tape guide means in the reverse direction away from said specific position when the tape is removed from the specific tape travel path; and checking means for contacting the tape guide means while in said specific position and preventing displacement of the tape guide means in said reverse direction during either recording or reproducing mode of operation.

2. An automatic tape loading type recording and/or reproducing apparatus as claimed in claim 1 which further comprises stop members for respectively stopping said tape guide means while in said specific position to prevent further movement of the tape guide means in said specific direction, and said checking means comprises pressing members for pressing the tape guide means against said stop members.

3. An automatic tape loading type recording and/or reproducing apparatus comprising:

a guide drum having heads for recording or reproducing signals on or from a tape;

a pair of tape guide means for engaging said tape, said guide means moving to specific positions in the vicinity of said guide drum, said guide means guiding the tape at said specific positions in a manner such that the tape travels along a specific tape travel path and over a specific angular expanse with respect to the guide drum;

means responsive to a loading operation for moving said tape guide means in specific directions to said specific positions when the tape is loaded into said specific tape travel path and responsive to an unloading operation for moving the tape guide means in the reverse directions away from said specific positions when the tape is removed from the specific tape travel path;

stop members for respectively stopping said tape guide means while in said specific positions to prevent further movement of the tape guide means in said specific directions; and checking means including pressing members for abutting the tape guide means and urging said guide means to press the tape guide means in said specific directions while in said specific positions in order to prevent displacement of the tape guide means in said reverse directions during either a recording or a reproducing mode of operation.

4. An automatic tape loading type recording and/or reproducing apparatus as claimed in claim 3 in which said checking means are normally held in positions where they are removed from the paths of movement of said tape guide means and where they do not obstruct the positional movement of the tape guide means, and means for positionally moving the checking means in follow-up action to the movement of the tape guide means.

5. An automatic tape loading type recording and/or reproducing apparatus as claimed in claim 3 which further comprises means for moving with said checking means and operating, when the checking means reach positions to check said tape guide means, by making contact with the tape loaded into said specific tape travel path by the tape guide means.

6. An automatic tape loading type recording and/or reproducing apparatus as claimed in claim 5 in which said means for making contact with the tape includes heads and an impedance roller.

7. An automatic tape loading type recording and/or reproducing apparatus as claimed in claim 3 in which each of said tape guide means comprises a base structure means mounted to undergo rotational displacement and guide pole means erected on said base structure means, and said guide pole means being pressed against said stop members responsive to operation of said pressing members, whereby the rotational displacement positions of the guide pole means are determined.

8. An automatic tape loading type recording and/or reproducing apparatus as claimed in claim 7 in which said guide pole means comprise an upright guide pole and an inclined guide pole erected on said base structure means, and said inclined guide pole is pressed against said stop members by said pressing members.

* * * * *